3,042,651
POLYMERIZABLE COMPOSITION CONTAINING UNSATURATED POLYESTER, AN ACRYLIC ESTER, A MONOVINYL BENZENE AND A VINYL ESTER OF AN ALKYL CARBOXYLIC ACID
Charles R. Martens, Parma Heights, Ohio, assignor to The Sherwin-Williams Company, Cleveland, Ohio, a corporation of Ohio
No Drawing. Filed June 19, 1959, Ser. No. 821,381
11 Claims. (Cl. 260—45.4)

This invention relates, as indicated to polymerizable acrylic modified polyester molding composition, and more particularly to such compositions which have been improved in respect to releasability of the cured product from molds.

Unsaturated polyesters have been produced recently possessing numerous advantages over the usual thermosetting resins, such as alkyds. These advantages are derived from the fact that the curing of these esters is accomplished by means of cross-linking between the individual linear polymer chains. No other product is formed during the curing reaction, and these polyesters may thus be molded, cast and laminated at relatively low pressures and temperatures. Not only does this simplify the design of the molds, but more importantly, low pressure molding and laminating techniques permit large articles to be fabricated which cannot be made by high pressure processes because of the high cost and physical limitations of such equipment.

The unsaturated polyester resins of the present invention are produced from an admixture of a previously prepared linear unsaturated polyester and an unsaturated vinyl-type monomer. The final curing of these polymerizable compositions is essentially a vinyl-type polymerization initiated by a free-radical polymerization initiator, such as the peroxides and azo compounds. The final cross-linked polymer is referred to as an unsaturated polyester resin. The polyester portion of the present compositions is referred to as a linear, unsaturated polyester. The present invention is particularly directed to unsaturated polyester resins which are characterized by a further modification, i.e., the inclusion of an acrylic type modifier.

The acrylic modified unsaturated polyester resin has been found to have particular utility in match mold molding techniques wherein a glass fiber mat is placed within the mold cavity, the cavity filled with an acrylic modified unsaturated polyester, and the mass cured under elevated temperature and pressure. When acrylic modified polyester resins are used in the fabrication of glass-fiber laminated products such as the familiar corrugated plastic used as a building material, superior adhesion, exterior durability, and flexural strength are secured in comparison with the properties of the character which may be secured when other polyester resins are employed. A principal defect of the acrylic modified polyester resins is, however, in the fact that poor release from the molds is also obtained. Cellophane release sheets have heretofore been employed with such resins.

It is the principal object of the present invention, therefore, to provide a polymerizable composition which yields on curing an acrylic modified unsaturated polyester resin, which composition is characterized in that improved releasability of the molded resins from the molds may be secured therewith.

Other objects of the invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Briefly stated, this invention is in the provision of a polymerizable composition containing a linear, unsaturated polyester comprising an esterification product of an unsaturated dibasic $C_4$ to $C_5$ aliphatic carboxylic acid, and a saturated $C_2$ to $C_6$ glycol, which polyester has an acid value in the range of from about 25 to 80. This ester is dissolved in a mixture composed of from 2 to 35 parts by weight of an acrylic ester and the balance of a total of 100 parts of the ester solution being a monovinyl benzene. To this polymerizable composition is added from .1 to 2 parts per 100 parts of the polymerizable composition of the vinyl alcohol ester of a saturated long chain alkyl carboxylic acid.

Thus, the polymerizable compositions of the present invention are composed of a basic linear, unsaturated polyester and at least two polymerizable monomers, one of which is a monovinyl benzene, and the other of which is an alkyl ester of an acrylic acid. This is the basic composition of the present invention. To this composition is added, in accordance therewith, a vinyl alcohol ester of a long chain, saturated aliphatic carboxylic acid. The resulting composition with or without additional ingredients, is ready for use in molding such as, for example, in the production of corrugated sheets for use as structural building material. It becomes convenient to describe more particularly each of the aforementioned essential ingredients of the present invention.

The linear, unsaturated polyester of the present invention is a conventionally produced esterification product of an unsaturated dibasic $C_4$ to $C_5$ aliphatic carboxylic acid such as maleic, fumaric acid, itaconic acid, citraconic acid, mesaconic acid, or the anhydrides thereof with or without a modifying dibasic acid of the saturated type (aromatic dibasic acids and anhydrides being considered equivalent to saturated dibasic aliphatic acids and anhydrides for the purpose of this invention). Such saturated dibasic acids are $C_4$ to $C_{10}$ and include phthalic isophthalic, terephthalic, succinic, methyl succinic, glutaric, adipic, pimelic, suberic, azelaic, sebacic, and their anhydrides, and a $C_2$ to $C_6$ glycol. Glycols useful herein may contain ether linkages, —O—, e.g. as in diethylene glycol and triethylene glycol. The amount of glycol used in forming these polyesters is that which is at least sufficient to completely esterify the carboxylic acid content of the acid portion of the polyester and preferably a slight excess. In most cooks by which such polyesters are formed, a slight excess of glycol over the carboxylic content of the reaction mass is employed. A general formulation for the basic polyester contemplates one mole of a dibasic carboxylic acid or mixture of dibasic carboxylic acids including at least 50% of an unsaturated $C_4$ to $C_5$ aliphatic dicarboxylic acid, and 1.1 mole of a saturated $C_2$ to $C_6$ glycol. The esterification is conventional and is usually carried out in a temperature range of from 360° F. to 390° F. with the removal of water, over a period of 6 to 18 hours to yield a product which has an acid value within the range of from about 25 to about 80. A specific polyester for use in accordance with the present invention may be prepared by esterifying the following composition:

*Example 1*

| | Mole |
|---|---|
| Fumaric acid | 0.5 |
| Phthalic anhydride | 0.5 |
| Propylene glycol | 1.1 |

The foregoing ingredients are mixed in a suitable reactor and heated to a temperature of 360° F. As the esterification reaction proceeds, the temperature will rise to about 390° F. where it is maintained for the balance of the esterification reaction. The total amount of time required for the esterification reaction is about 8 hours to yield a product having an acid value of 50. Water is continuously removed during the course of the reaction.

To form a polymerizable composition in accordance herewith, the foregoing linear, unsaturated polyester is dropped from the reaction vessel into a 50–50 mixture of monomeric styrene and monomeric methyl methacrylate; the ratio of linear, unsaturated polyester to monomer admixture is 60:40.

It is to the foregoing composition that a vinyl alcohol ester of a long chain saturated fatty acid, e.g. vinyl stearate is added in an amount within the range of from about 0.1 to 2 parts per 100 parts of the polymerizable composition. In the specific case cited above, the vinyl alcohol ester was vinyl stearate employed in amounts, respectively of 0.5, 1, 1.5 and 2 parts per 100 parts of polymerizable mixture.

The resultant compositions are ready for use in molding by the matched mold molding technique.

The mold is provided with a glass fiber mat, and benzoyl peroxide in the amount of 1% by weight of the polymerizable composition above described is added to initiate the cross linking to form the acrylic modified linear, unsaturated polyester resins of the present invention. Cure is effected at 250° F. for a period of 1 minute under a pressure of 4,000 lbs. per square inch. Resins formulated in accordance with the above exhibit no sticking in the mold. A corresponding example in which the vinyl stearate component was omitted stuck badly to the mold necessitating arduous clean-up of the mold and disposal of the product.

Another example of a linear, unsaturated polyester is that which is produced using maleic anhydride in place of the fumaric acid of Example 1 above.

*Example 2*

The following ingredients were mixed and esterified in accordance with the procedure set forth in Example 1 above:

| | Mole |
|---|---|
| Maleic anhydride | 0.5 |
| Phthalic anhydride | 0.5 |
| Diethylene glycol | 1.1 |

The foregoing composition was esterified at a temperature in the range of from 360° F. to 390° F. as set forth in Example 1. The cook was continued until an acid value of about 50 was attained.

When the cook was completed, the linear, unsaturated polyester was dropped into a mixture (50:50), of vinyl toluene and ethyl acrylate. The ratio of the linear, unsaturated polyester to the 50:50 mixture of the monomers was again 60:40 parts by weight.

In order to provide a polymerizable acrylic modified polyester composition useful in molding and free from sticking characteristics with respect to the mold, vinyl palmitate is added to the polymerizable composition in an amount in the range of from .1 to 2 parts per 100 parts of polymerizable composition. Specifically, 0.1, 0.5, 1.0, and 2 parts 100 parts of polymerizable mixture are added to provide compositions ready for use in molding by the matched mold technique. To the completed compositions is added 1% by weight of a peroxide free-radical initiator, such as, cumene hydroperoxide. The polymerizable composition with the initiator contained therein may be poured on glass fiber mats in place in the mold. Cure is effected as in Example 1 at 250° F. for a period of about 1 minute under a pressure of 4,000 lbs. per square inch. No sticking is observed with compositions of the above formulations.

Instead of the particular linear, unsaturated polyesters set forth above, wide variation in this material may be tolerated. Thus, instead of replacing half of the molar content of fumaric or maleic acid with phthalic anhydride, linear, unsaturated polyesters of fumaric acid and hexamethylene glycol (1:1.1); fumaric acid-diethylene glycol (1:1.1); maleic anhydride-isophthalic acid-tetramethylene glycol (1:1:2.1); maleic anhydride-terephthalic acid-pentamethylene glycol (0.75:0.25:1.1); fumaric acid-adipic acid-propylene glycol (0.5:0.5:1.1); fumaric acid-sebacic acid-ethylene glycol (0.5:0.5:1.1); itaconic acid-phthalic anhydride-propylene glycol (0.75:0.25:1.1); etc. polyesters may be used in the practice of the present invention. The numbers in brackets following the listing of ingredients represents molar ratios of the several ingredients. These polyesters are cooked according to conventional procedures to acid values within the range of 25 to 80.

As indicated above, after formation of the basic linear, unsaturated polyester, the reaction mass is dripped into a mixture of polymerizable monomers, one of which is a vinyl substituted benzene, such as styrene or vinyl toluene, and the other of which is an acrylic ester. Using 60 parts of the linear, unsaturated polyester as a base from which to calculate, the amount of acrylic ester monomer admixture is in the range of from 2 to 35 parts, and the balance of a total of 100 parts of linear, unsaturated polyester plus monomer admixture is a monovinyl substituted benzene such as, styrene or vinyl toluene.

The acrylic esters referred to above include the alkyl acrylates, alkyl alkacrylates, and the alkyl chloracrylates, methyl methacrylate and ethyl acrylate have been exemplified above. As replacement for part of, or all of the aforegoing acrylic esters exemplified above, there may be used methyl acrylate, propyl acrylate, butyl acrylate, hexyl acrylate, lauryl acrylate, ethyl methacrylate, butyl methacrylate, lauryl methacrylate, methyl chloracrylate, ethyl chloracrylate, butyl chloracrylate, methyl ethacrylate, etc.

The acrylic ester in the linear, unsaturated polyester is by itself slow curing. The addition of the monovinyl benzene is for the purpose of speeding up the time of cure. Depending, therefore, upon the desired cure rate, varying amounts of the monovinyl benzene components, and the acrylic ester components in the monomer admixture may be made within the ranges above stated.

The foregoing acrylic modified linear unsaturated polyesters without further treatment when used in conjunction with glass fiber filler, sisal fiber filler, asbestos fiber filler, and with or without the addition of pigmentary material, such as calcium carbonate, clay, silicates of various kinds, and/or color imparting pigments, demonstrate a pronounced tendency to stick to the mold.

In accordance with the present invention, therefore, it has been found that, by including from about 0.1 to about 2 parts per 100 parts of the solution of the linear, unsaturated polyester in the monomer admixture, of a vinyl alcohol ester of a saturated long chain fatty acid obviates this difficulty. The long chain saturated fatty acids which may be used to form the vinyl esters include, therefore, decanoic acid, undecanoic acid, dodecanoic acid, myristic acid, palmitic acid, stearic acid, and arachidic acid, as well as commercial mixtures of fatty acids within the range of from 10 to 20 carbon atoms. Vinyl stearate, vinyl palmitate, vinyl laurate and vinyl decanate are principal examples of the vinyl esters herein contemplated. Any of the foregoing vinyl esters may be used to replace the vinyl stearate in the amounts indicated in the Examples 1 and 2 which are illustrative of the mode of compounding and using the present invention.

*Example 3*

44.4 parts by weight of a linear, unsaturated polyester formed from .5 mole of fumaric acid, .5 mole of phthalic anhydride, 1.1 mole propylene glycol (to which 2% by weight of the previous ingredients of pentaerythritol had been added to improve the body of the resultant polyester after esterification) were dropped into a mixture of 20.0 parts by weight of styrene and 7.2 parts by weight of methyl methacrylate.

To the foregoing polymerizable composition were then added 28.4 parts of kaolin and 0.5 parts by weight of vinyl stearate.

This polymerizable composition was then admixed with 0.5% by weight of the entire composition of benzoyl peroxide as an initiator, and molded with glass fiber mat in a metal die which had been previously cleaned with steel wool, washed with ethyl acetate and preheated for thirty minutes at 250° F. before adding the filled resin. The cure for the molding, which was ⅛ of an inch thick, was three minutes at 235° F. This molding had a flexural strength as determined by the ASTM standard procedure for determining flexural strength of 34,050 lbs. per square inch. The identical composition similarly treated omitting, however, the vinyl stearate, had a flexural strength of 30,590 lbs. per square inch. This latter result was indeed an unexpected result of the addition of vinyl stearate in improving the flexural strength of the addition of vinyl stearate in improving the flexural strength of the resultant product by better than ten percent.

There has thus been provided an improved acrylic modified polyester polymerizable composition, suitable for use in the match mold molding of fiber reinforced resinous products. Heretofore, the only manner in which acrylic modified linear, unsaturated polyester resinous products could be formed was by the employment of a cellophane separator sheet between the surface of the mold and the surface of the resultant resin. The employment of such a cellophane slip sheet quite obviously materially restricted the nature of the shape of the cavity of the mold since sharp corners and angles necessarily had to be avoided. The polymerizable compositions of the present invention require no cellophane separator sheets in order to produce satisfactorily molded products without sticking to the mold, and greatly expand the range of products which may be produced from such acrylic modified polyester resins by expanding the characteristics of the molds to include those which do have sharp corners, intricate designs, etc., which could not lend themselves previously to the employment of cellophane separator sheets.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A polymerizable composition containing (a) 60 parts by weight of linear, unsaturated polyester comprising an esterification product of an unsaturated dibasic $C_4$ to $C_5$ aliphatic carboxylic acid and a saturated $C_2$ to $C_6$ glycol having an acid value in the range of from 25 to 80, said polyester being dissolved in a mixture composed of from 2 to 35 parts by weight of an acrylic ester selected from the group consisting of alkyl acrylates, alkyl alkacrylates, and alkyl chloracrylates and the balance of 100 parts of polyester solution being a monovinyl benzene, and (b) from 0.1 to 2 parts per hundred parts of (a) of a vinyl alcohol ester of a saturated $C_{10}$ to $C_{20}$ alkyl carboxylic acid.

2. A polymerizable composition in accordance with claim 1, in which the linear, unsaturated polyester comprises an esterification product of an unsaturated, dibasic $C_4$ to $C_5$ aliphatic carboxylic acid, a saturated $C_4$ to $C_{10}$ dibasic carboxylic acid, and a saturated $C_2$ to $C_6$ glycol.

3. A polymerizable composition in accordance with claim 1, in which the linear, unsaturated polyester comprises an esterification product of maleic acid and a saturated $C_2$ to $C_6$ glycol.

4. A polymerizable composition in accordance with claim 1, in which the linear, unsaturated polyester comprises an esterification product of fumaric acid and a saturated $C_2$ to $C_6$ glycol.

5. A polymerizable composition in accordance with claim 1 in which the linear, unsaturated polyester comprises an esterification product of maleic acid, phthalic acid, and propylene glycol.

6. A polymerizable composition in accordance with claim 1 in which the acrylic ester is methyl methacrylate.

7. A polymerizable composition in accordance with claim 1 in which the alkyl acrylate is ethyl acrylate.

8. A polymerizable composition in accordance with claim 1 in which the monovinyl benzene is styrene.

9. A polymerizable composition in accordance with claim 1 in which the monovinyl benzene is vinyl toluene.

10. A polymerizable composition in accordance with claim 1 in which component (b) is vinyl stearate.

11. A polymerizable composition containing (a) 60 parts by weight of a linear unsaturated polyester of 0.5 mole of maleic acid, 0.5 mole of phthalic acid, and 1.1 mole of propylene glycol having an acid value of about 50, said polyester being dissolved in 20 parts by weight of styrene and 20 parts by weight of methyl methacrylate, and (b) from 0.5 to 2 parts of vinyl stearate.

References Cited in the file of this patent

UNITED STATES PATENTS

| | | |
|---|---|---|
| 2,118,864 | Reppe et al. | May 31, 1938 |
| 2,407,479 | D'Alelio | Sept. 10, 1946 |
| 2,443,735 | Kropa | June 22, 1948 |
| 2,677,067 | Johnson et al. | Apr. 27, 1954 |

OTHER REFERENCES

Schildknecht: "Polymer Processes," volume 10, High Polymer Series, pub. 1956 by Interscience Publishers, page 734.